Patented Jan. 17, 1950

2,495,145

UNITED STATES PATENT OFFICE 2,495,145

RUBBER COMPOSITIONS OF IMPROVED TACK

George E. P. Smith, Jr., and Joseph C. Ambelang, Akron, Ohio, assignors to The Firestone Tire & Rubber Company, Akron, Ohio, a corporation of Ohio No Drawing. Application December 30, 1944, Serial No. 570,758

8 Claims. (Cl. 260—3)

This invention relates to a rubber or a rubber composition, and it relates especially to synthetic rubbers having improved tack.

Synthetic rubbers, especially of the Buna S type (rubber-like copolymers of butadiene and styrene) differ from natural rubber in lacking the quality of "tackiness," or the ability of the uncured rubber to stick to itself, as distinguished from ordinary "stickiness," the latter term meaning the ability to stick to a foreign object. It has been found that the properties of tackiness and stickiness may or may not occur simultaneously in the same unvulcanized synthetic rubber composition. The tackiness of unvulcanized rubber is a valuable property, being necessary for the successful building of tires and other laminated products, such as belts, reinforced rubber hose, balloons, and other articles involving sticking pieces of a rubber or rubberized fabric together. Tackiness is also a necessary property of a rubber to be used in many adhesive cements, tapes, etc.

Because of this lack of tack it has been deemed necessary by the tire industry to spread Buna S tire plies with a natural rubber cement in order to impart the necessary tackiness to the surfaces of the plies for successfully sticking them together to build up tires. Also, it has heretofore been concluded that Buna S cements were not sufficiently adhesive to be used as replacements for natural rubber cements in most uses. Although the addition of certain "softeners," such as pine tar, rosin, pitch and the like, to natural rubber or reclaimed natural rubber has been heretofore known to increase the tackiness of such rubbers, these softeners are only slightly effective in Buna S and do not impart enough tack thereto for successful tire building operations.

The objects of the present invention are to provide a new compounding ingredient for imparting substantial tack to a rubber; to provide a rubber composition having increased tack and other desirable physical properties; to provide a Buna S rubber having sufficiently inherent tack for direct utilization in a tire without the use of any natural rubber; and to provide a method of making these improved rubber compositions. Other objects of the invention will be manifest in the description thereof which follows.

The invention involves the discovery that the combination of two substances, in themselves not very effective, provides a compounding ingredient which substantially improves the tackiness of a rubber. The new "tackifier" compounding ingredient is essentially made up of an alkyl substituted phenolic sulfide and an organic acidic substance or a metallic salt thereof. The alkyl-phenol-sulfides of use in the present invention are products obtained by the reaction of an alkyl-phenol with a sulfur chloride.

The alkyl-phenols suitable for the preparation of the resinous sulfides may be selected from phenols having the following formula:

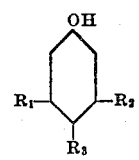

wherein $R_1$ and $R_2$ are hydrogen or alkyl radicals and $R_3$ is a hydrocarbon radical containing three or more carbon atoms. A preferred reaction product of such phenol with sulfur chloride or sulfur monochloride is a resinous product which may be represented as follows:

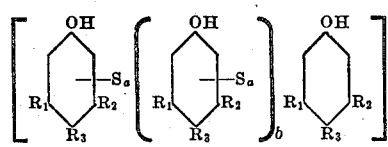

wherein $a$ and $b$ are simple integers, and $R_1$ and $R_2$ and $R_3$ are as above indicated. Examples of suitable phenols are as follows:

p-tert-amyl-phenol
p-propyl-phenol
p-tert-butyl-phenol
p-sec-hexyl-phenol
p-octyl-phenol
p-phenyl-phenol
p-cyclohexyl-phenol
p-(4-tolyl)-phenol
4-tert-butyl-m-cresol
p-cumyl-phenol
p-(4-tert-butyl-phenyl)-phenol
3,5-dimethyl-4-tert-butyl-phenol
3-ethyl-4-heptyl-phenol
4-lauryl-phenol
4-decyl-phenol
4-sec-butyl-phenol
4-n-butyl-phenol
4-n-amyl-phenol
3-methyl-4-tert-amyl-phenol
4-diisobutyl-phenol The organic acidic substance component of the tackifier combination may be chosen from the group of organic carboxylic acids each containing between about 10 and 25 carbon atoms. This group includes resin acids, higher molecular weight fat acids and mixtures of these such as the tall oil acids (by-product of wood pulp industry). Tall oil acids consist essentially of about 45–55 per cent of fat acids and 40–45 per cent of resin acids. The fat acids consist almost entirely of oleic (15–23 per cent), linoleic (71–79 per cent) and linolenic (6 per cent). Also a small amount of palmitic acid may be present. The resin acids consist mainly of abietic acid (60–90 per cent), also known as "rosin." Stearic acid may be commercially separated from hydrogenated tall oil (see G. Papps and D. F. Othmer, Ind. Eng. Chem., 36, 430 (1944)). The acids derivable from tall oil and related higher fat acids, as abietic, lauric and stearic acids, are suitable for use in the invention.

Although the acid or acidic substance itself (e. g., rosin) may be used in combination with the sulfide, it is ordinarily preferred to use a metallic salt-like product of the acid. Salts of alkali metals, such as sodium or potassium, are sufficiently effective in so-called "gum" stocks (rubber compositions containing substantially no carbon black and only low loadings of any other filler type of pigment). Salts of other metals, notably zinc, iron and calcium, are ordinarily more desirable in carbon black rubber compositions and other highly loaded stocks, and these salts are also very effective in gum stocks.

The tackifier compounding ingredient may also contain a rubber softener or extender, without departing from the invention. In fact, results are often improved on adding an additional softener. It is believed that the effect of these softeners is slightly to swell and soften the rubber, thus making the tackiness imparted by the combination of the sulfide and the organic acid material somewhat more effective. The more desirable softeners appear to belong to the group of coal tar products, petroleum oils and gums and oils derived from wood.

The tackifying substances may be added to the polymer on the mill or in an internal mixer or the two constituents may be dispersed in the elastomer latex, the dried polymer being equally tacky in all cases. The tack improves somewhat on aging for a day or more after mixing. This improvement in tack is accompanied by a glossy surface suggestive of bloom. The tack is also improved in some cases by washing the surface with gasoline and allowing to dry a few minutes. The tack imparted by this combination is enhanced by addition of certain plasticizers and by heat-plasticizing the polymer before mixing in the tackifier. This improved tack in more plastic compounds may appear because of their smoother surfaces which permit a greater area of contact when two layers of stocks are brought together.

With the above discussion in mind, the following examples are presented for the purpose of illustrating specific aspects of the invention.

Example I

A commercial resinous preparation known as p-tert-amyl-phenol-sulfide was mixed with a commercial Buna S rubber (a copolymer of 10–50 parts of styrene and 90–50 parts of butadiene) in the ratio of 9 parts of the sulfide to 100 parts of the rubber. Only a slight increase in tackiness of the rubber resulted and the product was not sufficiently tacky for building tires or preparing adhesive cements of value. Similarly, 9 parts of a commercial preparation of zinc rosinate (a commercial zinc abietate containing 8.75 per cent of zinc) were mixed with 100 parts of Buna S and found to impart no appreciable additional tack to the rubber. However, when a mixture of 3 parts of the sulfide and 3 parts of the zinc rosinate was mixed with 100 parts of the same Buna S rubber, a product having enhanced tackiness resulted, which possessed sufficient tack for tire building purposes.

Example II

In the manner employed in Example I, 9 parts of a coal tar rubber softener ("Bardol," a liquid coal tar fraction sold by the Barrett Company) were mixed with 100 parts of a Buna S rubber, and it was observed that no additional tackiness was imparted to the rubber. Three parts of this coal tar softener were then added to the tackifier compounding ingredient of Example I (equal parts of each of the three components being used) and 9 parts of the resulting mixture were added to 100 parts of the same type of Buna S. The resulting rubber possessed excellent tack, making it suitable for direct use in tire body compositions and for adhesive cements. The product of this example possessed a slightly higher degree of tack than the product of Example I. It was also observed that practically no improvement in the tackiness of the standard Buna S rubber resulted on mixing it either with a combination of three parts of the sulfide and three parts of the coal tar softener or a combination of three parts of the zinc rosinate and three parts of the coal tar softener.

Example III

Sulfides of various phenols were produced by reacting one mole of the phenol with 0.5–1.0 mole of sulfur dichloride. Excellent results were obtained when the sulfides were substituted for the commercial sulfide of Examples I and II, in the cases involving the use of the following phenols:

p-tert-amyl-phenol
p-tert-butyl-phenol
p-cyclohexyl-phenol
p-octyl-phenol
p-phenyl-phenol
4-tert-butyl-m-cresol The amount of tackiness produced was not as satisfactory when sulfur monochloride was used instead of sulfur dichloride. Also, sulfides having little effect upon the tackiness of the rubber resulted when formed from:

o-amyl-phenol
p-chloro-phenol
p-cresol
3,5-dimethyl-phenol
2,4-di-tert-butyl-m-cresol

Example IV

A series of tackifier preparations was prepared from equal parts of the commercial sulfide resin of Example I, the coal tar softener of Example II, and various zinc salt preparations. Fifteen parts of each of the resulting compounding ingredients were mixed with 100 parts of a Buna S rubber, and the resulting tackiness noted. Excellent tackiness was secured through the use of two zinc rosinate preparations (one containing 4.8 per cent zinc and the other containing 8.75 per cent zinc), zinc laurate, and the zinc salt of tall oil acids. Also, equal parts of the sulfide and gum rosin improved the tack of the Buna S to a similar extent when added in the proportion of 10 parts per hundred of the rubber. When 20 parts of carbon black were mixed into the resulting tackified rubber compositions, the tackiness was substantially unimpaired in the cases where the zinc rosinates and the zinc salt of tall oil acids were used; when zinc laurate or gum rosin were employed, the addition of 30-40 parts of carbon black appreciably lowered the tack of the rubber composition, but the resulting rubber material possessed more tack than the original Buna S before the compounding ingredient was added.

*Example V*

Other softeners or plasticizers than the coal tar softener have also been successfully used. Excellent improvements in tackiness of Buna S were obtained when any one of the following plasticizers or extenders was substituted for the coal tar softener of Example II:

1. Pinene mercaptans
2. "Plastac" (a synthetic rubber plasticizer sold by Advance Solvents Chemical Corporation)
3. Pine tar
4. "Naftolen" (a plasticizer for synthetic rubber sold by Wilmington Chemical Corporation and reported to be an unsaturated hydrocarbon mixture obtained from the acid sludge from petroleum refining)

*Example VI*

Other metallic rosinates were successfully substituted for the zinc rosinate of Example I. Calcium rosinate and iron rosinate appeared to be fully the equivalent of the zinc rosinate. Sodium rosinate was satisfactory in "gum" stocks but was not as effective in rubber compositions containing carbon black.

From the above examples it is also apparent that best results are ordinarily obtained with resinous sulfides made by the use of sulfur dichloride rather than sulfur monochloride. Preferably about 0.9-1.0 mole of sulfur dichloride is employed per mole of the phenol. For instance, when 0.92 mole of sulfur dichloride was employed per mole of p-tert-amyl-phenol, the resulting resin contained 15.4 per cent of sulfur, which compared with a calculated value of 15.4 per cent of sulfur for the following formula:

$$(C_{11}H_{15}O)_2(C_{11}H_{14}O)_{11}S_{12}$$

Similarly, when 0.97 mole of sulfur dichloride was employed per mole of the same phenol, 16.9 per cent of sulfur was found in the product, as compared with a calculated value of 16.1 per cent of sulfur for the following formula:

$$(C_{11}H_{15}O)_2(C_{11}H_{14}O)_{32}S_{33}$$

Both of the above resinous products of high molecular weight were very effective in practicing the invention. These and other experiments have shown that the high molecular weight resinous sulfides are desirable, whereas the crystalline, low molecular weight sulfides are not so effective in improving the tackiness of a synthetic rubber or elastomer.

Although the bulk of the above discussion has related to improving the tackiness of Buna S, the invention is also applicable to certain other elastomers, such as polybutadiene rubber, reclaimed natural rubber, reclaimed Buna S and reclaimed mixtures of Buna S and natural rubber.

Modification may be made in the proportions and other details of the above examples without departing from the spirit of the invention or the scope thereof, as defined in the appended claims.

What is claimed is:

1. A rubbery butadiene-styrene copolymer composition containing a resinous reaction product of one molar proportion to p-tert-amyl-phenol and 0.9 to 1.0 molar proportion of sulfur dichloride, and a zinc rosinate.

2. A tacky reclaimed natural rubber composition containing a resinous reaction product of 0.9 to 1.0 molar proportion of sulfur dichloride and one molar proportion of a phenol having the formula

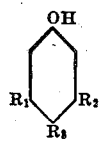

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

3. A tacky rubbery composition of the group consisting of a rubbery butadiene-styrene copolymer composition, a rubbery polybutadiene composition, a reclaimed natural rubber composition, a reclaimed rubbery butadiene-styrene copolymer and reclaimed mixtures of a rubbery butadiene-styrene copolymer and natural rubber, said rubbery composition containing a resinous reaction product of 0.9 to 1.0 molar proportion of sulfur dichloride and one molar proportion of a phenol having the formula

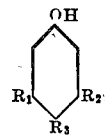

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

4. The method of increasing the tack of a plastic rubbery butadiene-styrene copolymer, which includes the step of treating the copolymer with a resinous reaction product of 0.9 to 1.0 molar proportion of sulfur dichloride and one molar proportion of a phenol having the formula

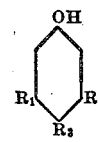

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

5. The method of increasing the tack of a plastic rubbery composition of the group consisting of a rubbery butadiene-styrene copolymer composition, a rubbery polybutadiene composition, a reclaimed natural rubber composition, a reclaimed rubbery butadiene-styrene copolymer composition and reclaimed mixtures of a rubbery butadiene-styrene copolymer and natural rubber, which includes the step of treating the rubbery composition with a resinous reaction product of 0.9 to 1.0 molar proportion of sulfur dichloride and one molar proportion of a phenol having the formula

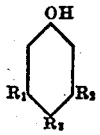

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

6. The method of increasing the tack of a plastic reclaimed natural rubber, which includes the step of treating the reclaimed rubber with a resinous reaction product of 0.9 to 1.0 molar proportion of sulfur dichloride and one molar proportion of a phenol having the formula

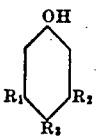

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

7. The method of increasing the tack of a plastic rubbery polybutadiene, which includes the step of treating the polybutadiene with a resinous reaction product of 0.9 to 1.0 molar proportion of sulfur dichloride and one molar proportion of a phenol having the formula

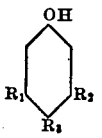

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

8. A tacky rubbery polybutadiene composition containing a resinous reaction product of 0.9 to 1.0 molar proportion of sulfur dichloride and one molar proportion of a phenol having the formula

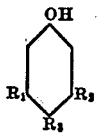

wherein $R_1$ and $R_2$ are members of the group consisting of hydrogen and alkyl radicals and $R_3$ is a hydrocarbon radical containing between 3 and 12, inclusive, carbon atoms, and a salt selected from the group consisting of zinc rosinate, calcium rosinate and iron rosinate.

GEORGE E. P. SMITH, Jr.
JOSEPH C. AMBELANG.

REFERENCES CITED

The following references are of record in the file of this patent:

UNITED STATES PATENTS

| Number | Name | Date |
|---|---|---|
| 2,175,082 | Hagen | Oct. 3, 1939 |
| 2,198,828 | Lieber | Apr. 30, 1940 |
| 2,307,037 | Gumlich | Jan. 5, 1943 |
| 2,310,449 | Lightbown | Feb. 9, 1943 |
| 2,319,959 | Tierney | May 25, 1943 |
| 2,346,826 | Cook et al. | Apr. 18, 1944 |
| 2,349,224 | Nill | May 16, 1944 |
| 2,359,122 | Kirby | Sept. 26, 1944 |
| 2,389,090 | Shields | Nov. 13, 1945 |

OTHER REFERENCES

Smith et al., Ind. & Eng. Chem., vol. 38, 1946, pp. 1166 to 1170.

Chatfield, Varnish Constituents, Interscience, 1944, page 82.

Cotton, India Rubber Journal, vol. 80, page 70, 1930.

India Rubber World, June 1943, page 269.

Socony-Vacuum Plasticizers for Synthetic Rubber, October, 1944, pp. 1 and 2.

Collected Papers of W. H. Carothers, Interscience 1940, pp. 391 and 392.

Ludwig et al., India Rubber World, vol. 111, No. 2, Nov. 1944, pp. 180, 186.

Certificate of Correction

Patent No. 2,495,145 January 17, 1950

GEORGE E. P. SMITH, JR., ET AL.

It is hereby certified that errors appear in the printed specification of the above numbered patent requiring correction as follows:

Column 6, line 4, before the word "rubbery" insert *tacky*; line 6, for "to" after "proportion" read *of*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*